(12) United States Patent
Chen

(10) Patent No.: US 6,463,820 B1
(45) Date of Patent: Oct. 15, 2002

(54) TRANSMISSION ASSEMBLY FOR BEACH VEHICLE

(75) Inventor: I-Min Chen, Shen Kang Shiang (TW)

(73) Assignee: Lun Tai Enterprise Co., Ltd., Taichung (TW)

(*) Notice: Subject to any disclaimer, the term of this patent is extended or adjusted under 35 U.S.C. 154(b) by 0 days.

(21) Appl. No.: 09/846,155

(22) Filed: May 2, 2001

(51) Int. Cl.7 ................................................. F16H 3/08
(52) U.S. Cl. ...................................................... 74/323
(58) Field of Search ........................... 74/322, 323, 324

(56) References Cited

U.S. PATENT DOCUMENTS 1,776,302 A * 9/1930 Truesdell
4,790,552 A * 12/1988 Lian ............................ 74/322

* cited by examiner

*Primary Examiner*—Dirk Wright
(74) *Attorney, Agent, or Firm*—Charles E. Baxley

(57) ABSTRACT

A transmission assembly for a beach vehicle includes a driving member which has pawls extending therefrom and a shaft extends through the driving member. A ring has recesses defined in an outer periphery thereof and a plurality of teeth are defined in an inner periphery of the ring. The pawls engaged with the recesses in the ring and a planet gear assembly is engaged with the teeth in the ring. A control member is movably mounted to the shaft and has protrusions extending from two sides of the control member. The protrusions are movably and alternatively engaged with concavities defined in a side of the driving member and the planet gear assembly so as to function the beach vehicle forward or backward.

8 Claims, 8 Drawing Sheets

TRANSMISSION ASSEMBLY FOR BEACH VEHICLE

FIELD OF THE INVENTION

The present invention relates to a transmission assembly for a beach vehicle and the transmission assembly provides forward and backward feature.

BACKGROUND OF THE INVENTION

A conventional beach vehicle generally includes a frame with three or four wheels and a transmission assembly having an engine which provides torque to the wheels. In order to simplify the structure of the beach vehicle, the beach vehicle can only move forward and cannot move backward.

The present invention intends to provide a transmission assembly for a beach vehicle that can move forward or backward.

SUMMARY OF THE INVENTION

In accordance with one aspect of the present invention, there is provided a transmission assembly for a beach vehicle and comprises a casing having a driving member with pawls rotatably received therein. A plurality of concavities are defined in the driving member and a ring has recesses defined in an outer periphery thereof so that the pawls are engaged with the recesses of the ring. A plurality of teeth are defined in an inner periphery of the ring so as to engage with a central gear with which a plurality of planet gears are engaged. A control member is movably mounted to the shaft and a plurality of protrusions extending from two sides of the control member. The protrusions are movably and alternatively engaged with the concavities of the driving member and engaging recesses defined in an inner periphery of the central gear. A shifting member is securely engaged with the control member so as to move the control member on the shaft.

The primary object of the present invention is to provide a transmission assembly for a beach vehicle that can be driven forward or backward.

The present invention will become more obvious from the following description when taken in connection with the accompanying drawings which show, or purposes of illustration only, a preferred embodiment in accordance with the present invention.

DETAILED DESCRIPTION OF THE PREFERRED EMBODIMENT

Figure 1:
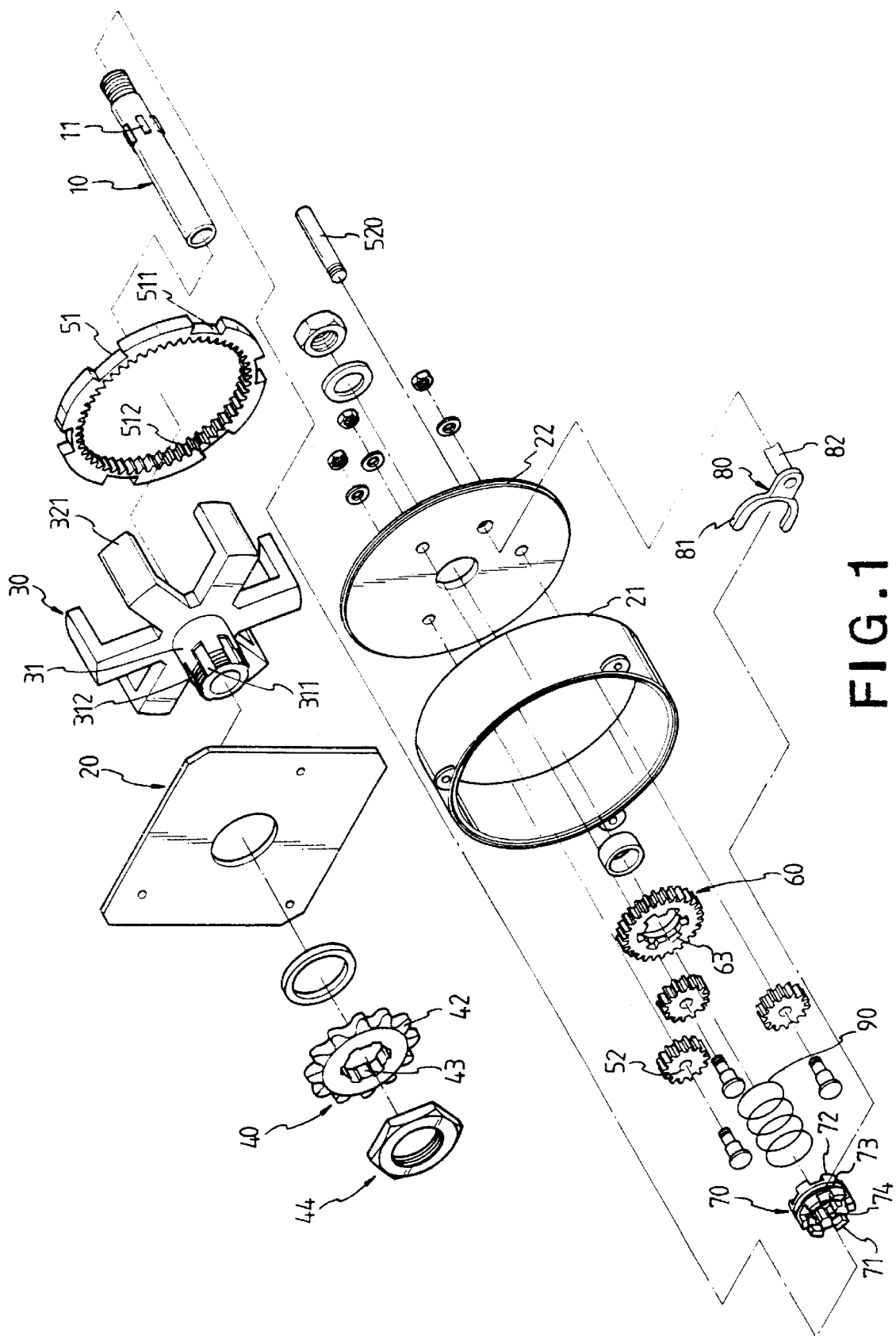
FIG. 1 is an exploded view to show a transmission assembly for a beach vehicle.
Figure 2:
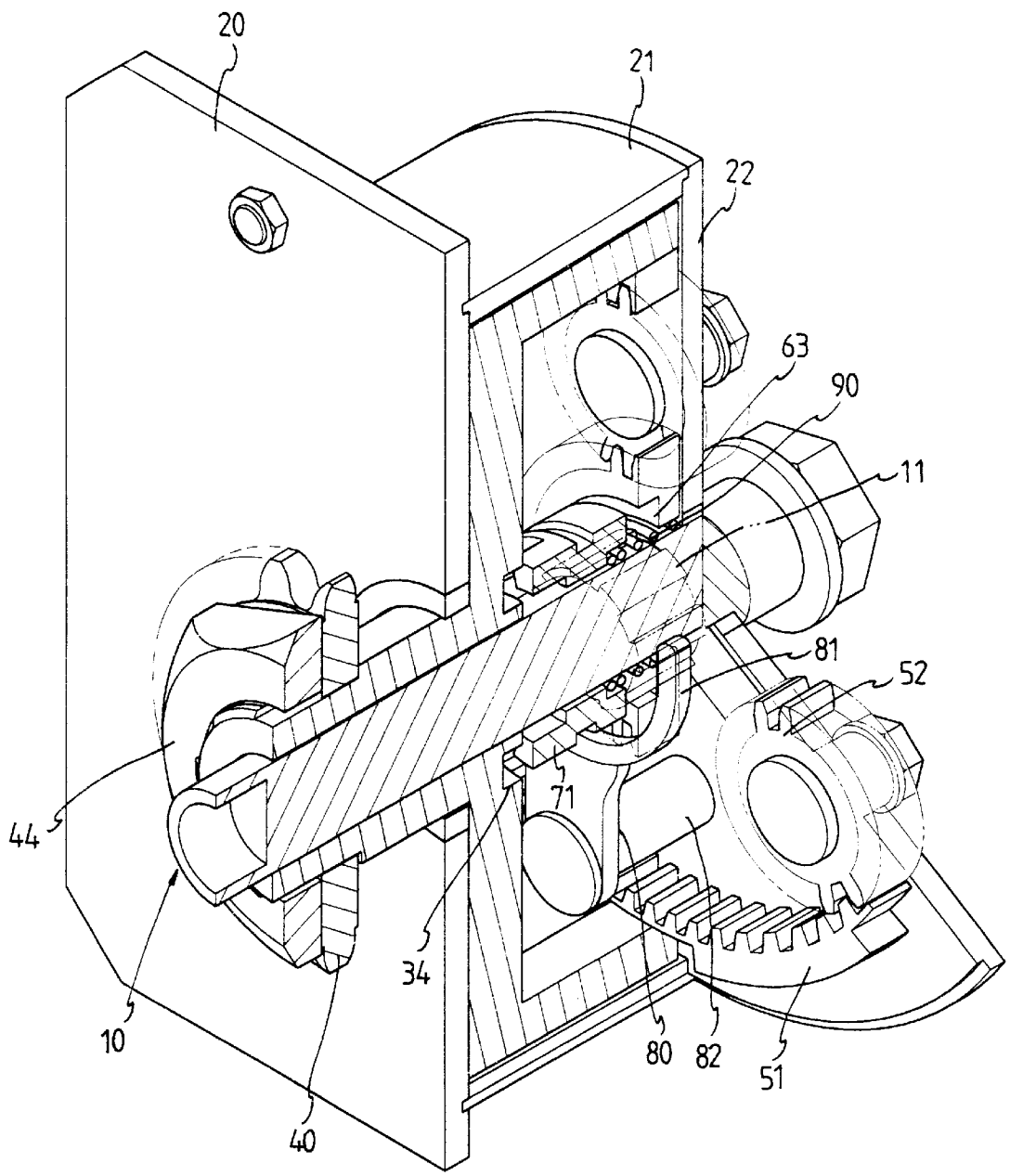
FIG. 2 is a perspective view, partly in section, to show the transmission assembly for a beach vehicle.
Figure 3:
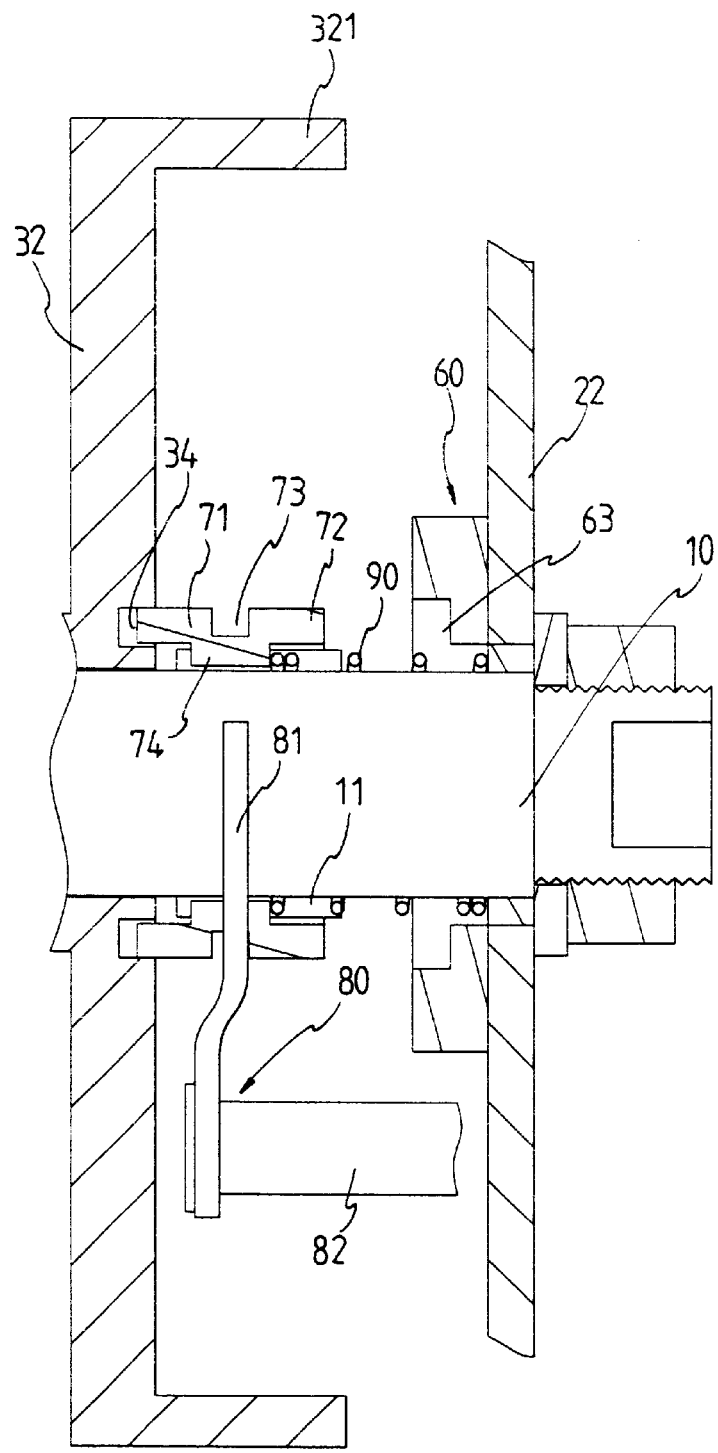
FIG. 3 is a cross sectional view to show when the control member is engaged with the driving member of the transmission assembly.

Referring to FIGS. 1 to 3, the transmission assembly for a beach vehicle of the present invention comprises a casing comprising a front board 20, a mediate portion 21 and a rear board 22. A driving member 30 is rotatably received in the casing and pawls 321 extend from a first side of the driving member 30. A tube 31 extends from a second side of the driving member 30 and extends out from the casing. A plurality of concavities 34 are defined in the first side of the driving member 30. The tube 31 has a plurality of notches 311 defined in an outer periphery thereof and a driving gear 40 has ribs 43 extending from an inner periphery of a central hole thereof, the ribs 43 engaged with the notches 311 defined in the outer periphery of the tube 31. A locking nut 44 is threadedly mounted to threads 312 on the tube 31 to position the driving gear 40. A shaft 10 extends through the casing and the tube 31, the shaft 10 having ridges 11 extending from an outer periphery thereof.

A ring 51 has recesses 511 defined in an outer periphery thereof and a plurality of teeth 512 are defined in an inner periphery of the ring 51. A central gear 60 is rotatably mounted to the shaft 10 and a plurality of planet gears 52 are connected to the rear board 22 by pins 520 and engaged between the teeth 512 of the ring 51 and the central gear 60. The pawls 321 of the driving member 30 are engaged with the recesses 511.

Figure 4:
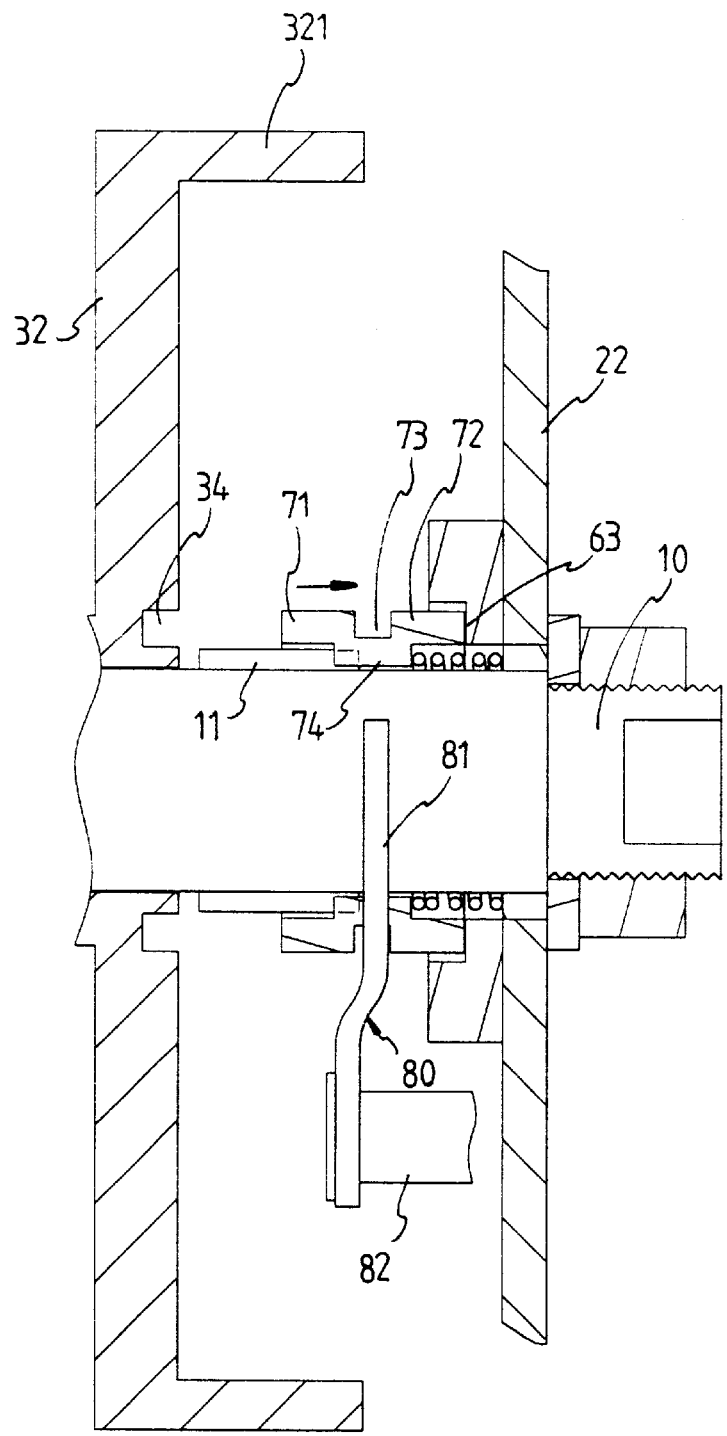
FIG. 4 is a cross sectional view to show when the control member is engaged with the central gear of the transmission assembly.
Figure 5:
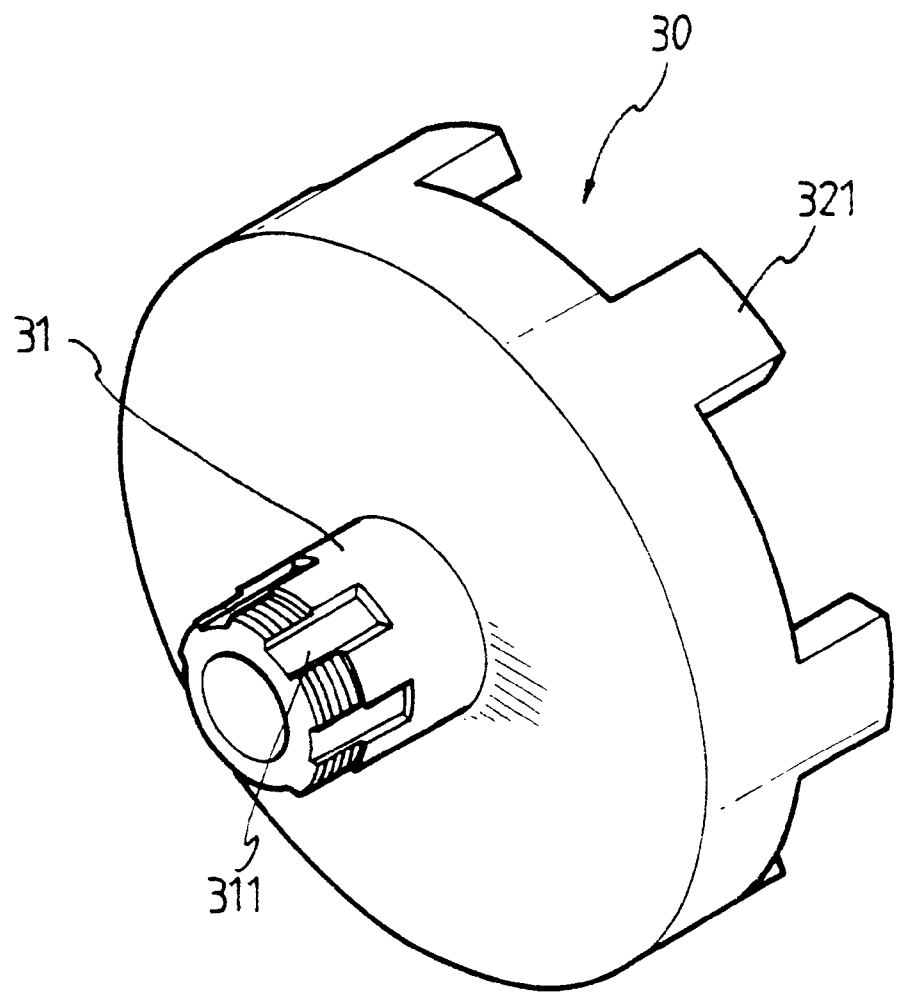
FIG. 5 is a perspective view to show another embodiment of the driving member of the transmission assembly of the present invention.

A control member 70 is movably mounted to the shaft 10 and a plurality of protrusions 71, 72 extend from two sides of the control member 70. The control member 70 has grooves 74 defined in a central hole thereof so that the ridges 11 are engaged with the grooves 74 of the control member 70. The control member 70 is irrotatably and movably mounted to the shaft 10. An annular groove 73 is defined in an outer periphery of the control member 70 and a shifting member 80 is connected to the control member 70 by engaging a fork 81 of the shifting member 80 with the annular groove 73. When moving the shifting member 80, the control member 70 can be movable on the shaft 10 and the protrusions 71, 72 are movably and alternatively engaged with the concavities 34 of the driving member 30 and engaging recesses 63 defined in an inner periphery of the central gear 60 as shown in FIGS. 3 and 4. A spring 90 is mounted to the shaft 10 and biased between the control member 70 and the central gear 60 so that the control member 70 can be normally kept at a position where the protrusions 71 are engaged with the concavities 34. When the protrusions 71 are engaged with the concavities 34, the beach vehicle is moved forward, the beach vehicle is moved backward when the protrusions 71 are disengaged from the concavities 34 and the protrusions 72 are engaged with the engaging recesses 63 of the central gear 60. When the central gear 60 is rotated, the planet gears 52 are rotated to rotate the ring 51 and drives the driving member 30 in the reverse direction. FIG. 5 shows that the driving member 30 can be made to be a disk with pawls 321 extending therefrom and this type of driving member 30 has better structural strength.

Figure 6:
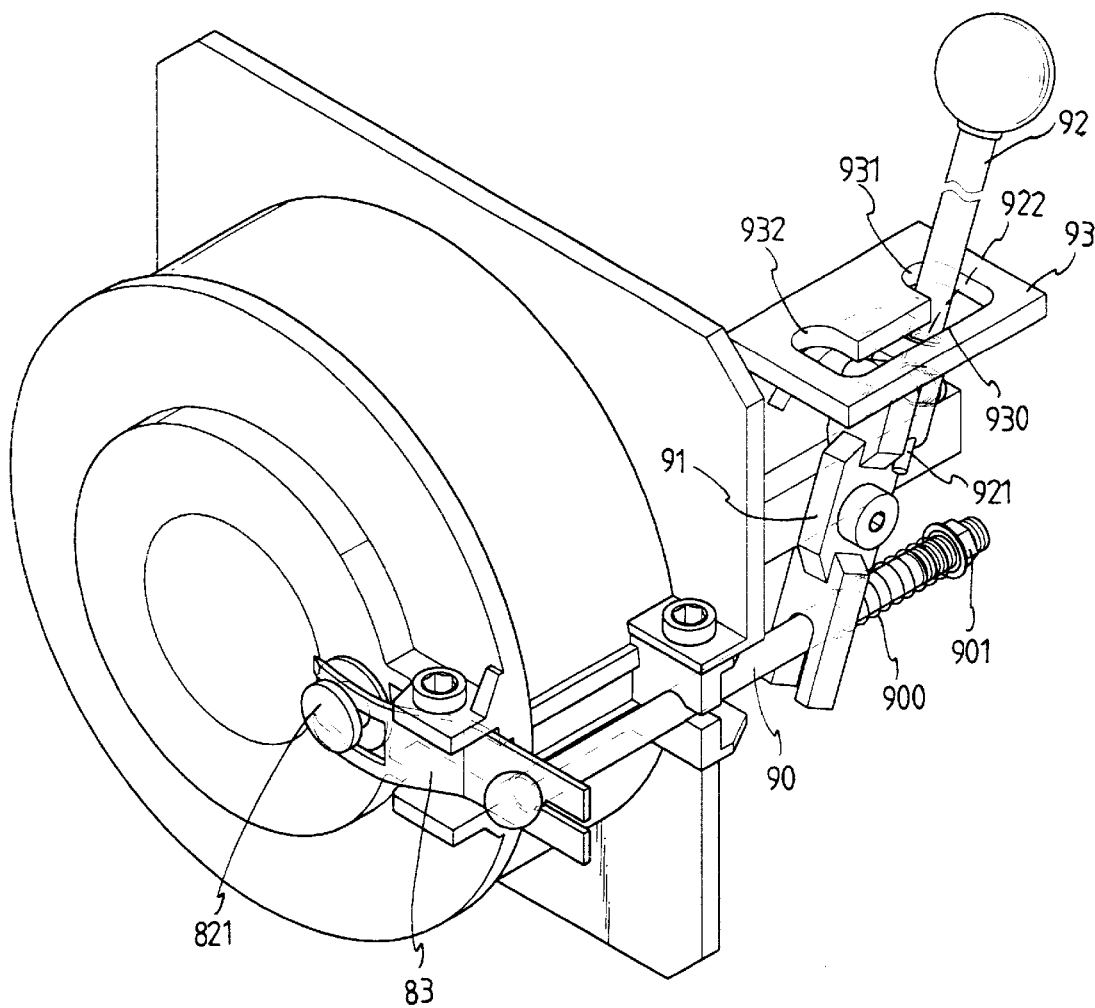
FIG. 6 is a perspective view to show a gear shafting device engaged with the shifting member of the transmission assembly.
Figure 7:
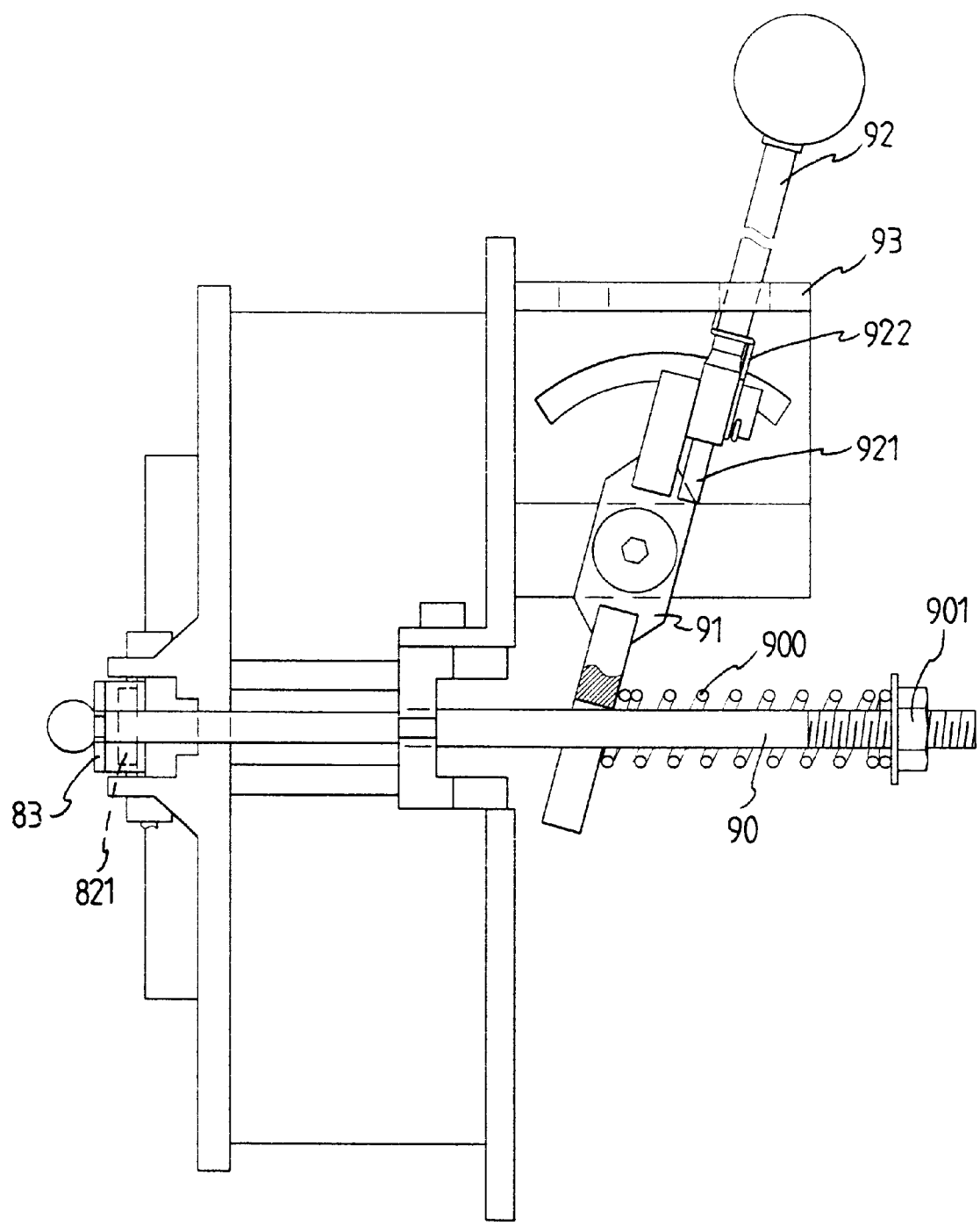
FIG. 7 is a plan view to show the gear shafting device which is located at a forward position.
Figure 8:
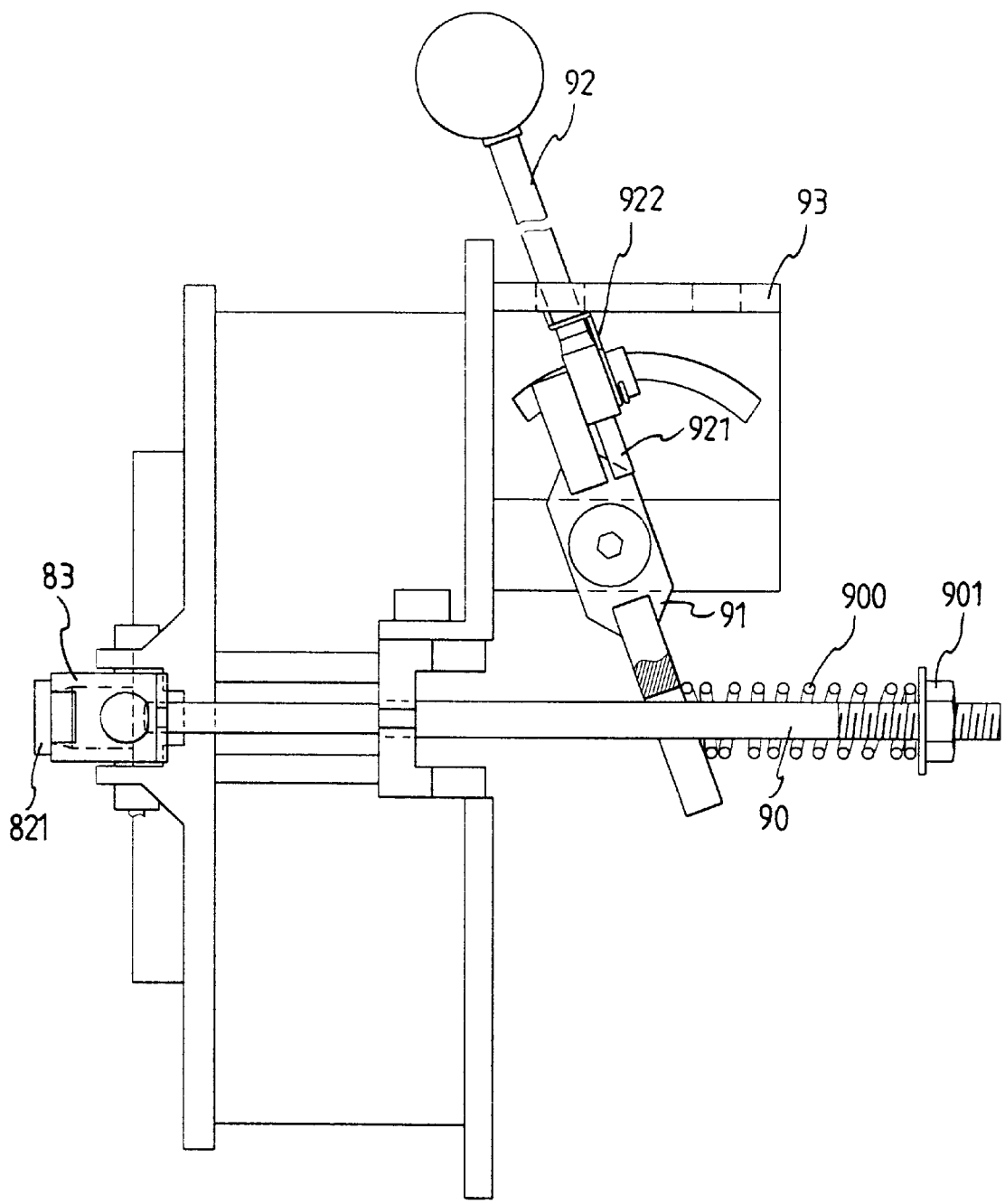
FIG. 8 is a plan view to show the gear shafting device which is located at a backward position.

Referring to FIG. 6, the shifting member 80 has an extension rod 82 which extends from the casing and a knob 821 on a distal end thereof. A pivotal member 83 is pivotally connected to the casing at a mediate point of the pivotal member 83 and a first end of the pivotal member 83 is engaged with the knob 821 on the extension rod 82, a second end of the pivotal member 83 engaged with a ball on a link 90. A swing member 91 is pivotally connected to the casing and a first end of the swing member 91 is movably engaged with the link 90, a second end of the swing member 91 has a fork engaged with a gear rod 92. A stop 901 is connected to the link 90 and a spring 900 is mounted to the link 90. The spring 900 is biased between the stop 901 and the first end of the swing member 91. A retaining plate 93 is connected to the casing and a slot 930 is defined through the retaining plate 93, the gear rod 92 movably extending through the slot 930. Two recesses 931, 932 are defined in the retaining plate 93 and communicate with the slot 930. The two recesses 931, 932 are respectively used to retain the gear rod 92 as the forward position and the backward position of the transmission assembly. The swing member 91 has a groove which receives a lower end 921 of the gear rod 92 so as to prevent the gear rod 92 from disengaged from the swing member 91. A torsion spring 922 has one end engaged with the gear rod 92 and the other end of the torsion spring 922 contacts fixed part beside the gear rod 92 so as to position the gear rod 92 in either one of the two recesses 931, 932 in the plate 93. Referring to FIGS. 7 and 8, when retaining the gear rod 92 in the recess 931, the extension rod 82 is not be pulled away from the casing and the control member 70 is engaged with the driving member 30. When the gear rod 92 is moved to the recess 932, the shifting member 80 is pulled and the control member 70 is shifted to engage with the central gear 60.

While we have shown and described various embodiments in accordance with the present invention, it should be clear to those skilled in the art that further embodiments may be made without departing from the scope of the present invention.

What is claim is:

1. A transmission assembly for a beach vehicle, comprising:
    a casing having a driving member rotatably received therein and said pawls extending from a first side of said driving member, a tube extending from a second side of said driving member and extending from said casing, a plurality of concavities defined in said first side of said driving member, a driving gear securely mounted to said tube, a shaft extending through said tube;
    a ring having recesses defined in an outer periphery thereof and a plurality of teeth defined in an inner periphery of said ring, a central gear rotatably mounted to said shaft and a plurality of planet gears engaged between said teeth of said ring and said central gear, said pawls engaged with said recesses;
    a control member movably mounted to said shaft and a plurality of protrusions extending from two sides of said control member, said protrusions movably and alternatively engaged with said concavities of said driving member and engaging recesses defined in an inner periphery of said central gear, and
    a shifting member securely engaged with said control member so as to move said control member on said shaft.

2. The assembly as claimed in claim 1 further comprising a plurality of notches defined in an outer periphery of said tube and said driving gear having ribs extending from an inner periphery of a central hole thereof, said ribs engaged with said notches defined in said outer periphery of said tube.

3. The assembly as claimed in claim 1, wherein said shaft has ridges extending from an outer periphery thereof and said control member has grooves defined in a central hole thereof, said ridges engaged with said grooves of said control member.

4. The assembly as claimed in claim 1 further comprising an annular groove defined in an outer periphery of said control member and said shifting member having a fork which is engaged with said annular groove.

5. The assembly as claimed in claim 1 further comprising a spring mounted to said shaft and biased between said control member and said central gear.

6. The assembly as claimed in claim 1 further comprising a pivotal member pivotally connected to said casing at a mediate point of said pivotal member and a first end of said pivotal member engaged with an extension rod extending from said shifting member, a second end of said pivotal member engaged with a link, a swing member pivotally connected to said casing and a first end of said swing member movably engaged with said link, a second end of said swing member engaged with a gear rod.

7. The assembly as claimed in claim 6 further comprising a stop connected to said link and a spring mounted to said link, said spring biased between said stop and said first end of said swing member.

8. The assembly as claimed in claim 6 further comprising a retaining plate connected to said casing and a slot defined through said retaining plate, said gear rod movably extending through said slot, two recesses defined in said retaining plate and communicate with said slot, a torsion spring engaged with said gear rod and biasing said gear rod to be positioned in one of said two recesses in said plate.

* * * * *